(12) United States Patent
Tveita

(10) Patent No.: US 8,156,953 B2
(45) Date of Patent: Apr. 17, 2012

(54) METHOD AND DEVICE FOR REGULATING A PRESSURE IN A HYDRAULIC SYSTEM

(75) Inventor: Johannes Tore Tveita, Kongsberg (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 1039 days.

(21) Appl. No.: 12/075,907

(22) Filed: Mar. 14, 2008

(65) Prior Publication Data

US 2008/0223467 A1 Sep. 18, 2008

(30) Foreign Application Priority Data

Mar. 16, 2007 (NO) .................................. 20071434

(51) Int. Cl.
*F17D 1/00* (2006.01)

(52) U.S. Cl. .. 137/12; 137/102; 137/236.1; 137/596.17; 166/319

(58) Field of Classification Search ............... 137/116.3, 137/115.21, 115.22, 115.25, 596, 596.17, 137/596.2, 613, 116.5, 115.14, 115.18, 87.05, 137/87.06, 102, 236.1, 565.34, 115.01, 115.13, 137/505.11, 12; 166/88.4; 91/5; 60/418; 475/129

See application file for complete search history.

(56) References Cited

U.S. PATENT DOCUMENTS

| | | | | |
|---|---|---|---|---|
| 3,612,081 A * | 10/1971 | Williams | | 137/12 |
| 3,677,001 A * | 7/1972 | Childers et al. | | 60/398 |
| 3,858,598 A * | 1/1975 | Carman et al. | | 137/102 |
| 3,911,941 A * | 10/1975 | Gerbic et al. | | 137/115.22 |
| 3,993,100 A * | 11/1976 | Pollard et al. | | 137/628 |
| 4,036,247 A * | 7/1977 | Baugh | | 137/236.1 |
| 4,174,000 A * | 11/1979 | Milberger | | 166/363 |
| 4,234,043 A * | 11/1980 | Roberts | | 166/336 |
| 4,246,923 A * | 1/1981 | Dayet | | 137/565.34 |
| 4,296,910 A * | 10/1981 | Gratzmuller | | 251/28 |
| 4,387,783 A * | 6/1983 | Carman | | 180/165 |
| 4,407,183 A * | 10/1983 | Milberger et al. | | 91/1 |
| 4,413,642 A * | 11/1983 | Smith et al. | | 137/14 |
| 4,442,902 A * | 4/1984 | Doremus et al. | | 166/374 |
| 4,497,369 A * | 2/1985 | Hurta et al. | | 166/368 |
| 4,761,953 A * | 8/1988 | Rosman | | 60/414 |
| 4,880,060 A * | 11/1989 | Schwendemann et al. | | 166/336 |
| 4,923,008 A * | 5/1990 | Wachowicz et al. | | 166/373 |

(Continued)

FOREIGN PATENT DOCUMENTS

JP 10-296815 4/1997

*Primary Examiner* — Stephen M Hepperle
*Assistant Examiner* — Matthew W Jellett

(57) ABSTRACT

The present invention relates to a method for regulating a pressure in a hydraulic system for operating at least one actuator in a subsea installation, having a fluid supply line (102) connected to a source of pressurized fluid (101) at a remote location delivering fluid at a constant pressure to the subsea installation, comprising first and second control valves (103, 105) controlled by an electronic control unit (107), and at least one pressure sensor (106) and an accumulator (104) arranged between the first and second control valve (103, 105), where the pressure in the fluid supply line (102') to the actuator is regulated by regulating the pressure in the accumulator (104) by adding fluid from the source of pressurized fluid (101) through the first control valve (103) if the pressure is too low or releasing pressure through the second control valve (105) to a fluid return line (120) if the pressure is too high and thereby establishing the desired pressure for operating the actuator. The invention also relates to a device for performing the method.

14 Claims, 2 Drawing Sheets

U.S. PATENT DOCUMENTS

| | | | | |
|---|---|---|---|---|
| 5,070,695 A * | 12/1991 | Metzner | | 60/448 |
| 5,188,180 A * | 2/1993 | Jennings | | 166/338 |
| 5,238,070 A * | 8/1993 | Schultz et al. | | 166/386 |
| 6,095,184 A * | 8/2000 | Neff et al. | | 137/488 |
| 6,102,673 A * | 8/2000 | Mott et al. | | 417/392 |
| 6,192,680 B1 * | 2/2001 | Brugman et al. | | 60/398 |
| 6,202,753 B1 * | 3/2001 | Baugh | | 166/364 |
| 6,298,767 B1 * | 10/2001 | Porter | | 91/4 R |
| 6,983,592 B2 * | 1/2006 | Bruun | | 60/415 |
| 7,137,450 B2 * | 11/2006 | Johansen et al. | | 166/316 |
| 7,159,662 B2 * | 1/2007 | Johansen et al. | | 166/374 |
| 7,306,043 B2 * | 12/2007 | Toekje et al. | | 166/375 |
| 7,513,521 B2 * | 4/2009 | Posselius et al. | | 280/463 |
| 7,905,088 B2 * | 3/2011 | Stephenson et al. | | 60/414 |
| 7,926,501 B2 * | 4/2011 | Springett et al. | | 137/14 |
| 2005/0012390 A1 * | 1/2005 | Kato et al. | | 303/146 |
| 2006/0254763 A1 | 11/2006 | Tips et al. | | |
| 2008/0185046 A1 * | 8/2008 | Springett et al. | | 137/14 |
| 2008/0264646 A1 * | 10/2008 | Sten-Halvorsen et al. | | 166/360 |

\* cited by examiner

METHOD AND DEVICE FOR REGULATING A PRESSURE IN A HYDRAULIC SYSTEM

BACKGROUND OF THE INVENTION

The present invention relates to a method and device for regulating the pressure in a hydraulic system for operating at least one actuator in a subsea installation.

In developing petroleum fields, a need might exist for hydraulic fluid pressures other than those provided by the ordinary high pressure (HP) and low pressure (LP) lines running to the subsea installation. One might find an example of such a need in connection with an "intelligent well", where the use of sliding sleeve valves enables the control of production from more than one zone. Generally, the pressure needed for the actuation of such valves is lower than what is necessary for the SCSSV (Surface controlled Subsurface safety valve).

One possible solution for this situation is to run more than two hydraulic fluid lines down to the subsea installation through the umbilical. However, the use of such a solution is not favored when large distances exist between the source of hydraulic fluid and the subsea installation, due to increased installation and operation costs.

Another possible solution is to provide a system for regulating the pressure at the subsea installation. Normally, this involves using one system to regulate the pressure needed for operation of one specific valve and another system to regulate the pressure needed for operation of another specific valve. However, this again is a costly and volume demanding solution.

SUMMARY OF THE INVENTION

An object of the present invention is to provide a system which uses the existing HP and LP lines to provide hydraulic fluid at the desired pressure at the subsea installation. Another object is to provide a system capable of delivering different determined pressures from the subsea installation to an actuator. A further object is to provide a system which can be used in connection with a range of actuators operating valves in the well. Yet another object is to provide a system which is remotely operable and gives feedback on how much hydraulic fluid is consumed at the subsea installation.

The present invention provides a method for regulating the pressure in a hydraulic system for operating at least one actuator in a subsea installation. The hydraulic system includes a fluid supply line for supplying hydraulic fluid from a source of pressurized fluid at a remote location to the subsea installation. This remote location could be another subsea installation, a floating unit or a land based unit. The supply line delivers fluid at a constant pressure to the subsea installation. This supply line may be a normal HP or LP line running through the umbilical from a platform or floating vessel and down to the subsea installation. The hydraulic system comprises first and second control valves which are located close to the subsea installation and are controlled by an electronic unit, and at least one pressure sensor and accumulator arranged between the first and second control valves.

According to the method of the invention the pressure in the fluid supply line to the actuator is regulated by regulating the pressure in the accumulator. This is accomplished by adding fluid from the source of pressurized fluid through the first control valve if the pressure is registered to be too low or releasing pressure through the second control valve and into a fluid return line if the pressure is registered to be too high, thereby establishing the desired pressure for operating the actuator. With such a system one has the possibility of regulating the pressure for all the pressure values located between the remote source and the return line.

According to another aspect of the invention, the method may comprise the steps of regulating the pressure in the accumulator to a given first pressure range for operating one actuator, and thereafter regulating the pressure in the accumulator to a given second pressure range for operating of another actuator.

According to another aspect of the invention, the system may comprise a third control valve arranged downstream of the second control valve, wherein the third control valve is closed to close the fluid supply line to the subsea installation while the pressure in the accumulator is regulated to the desired pressure range for operating a desired actuator, and thereafter opened to allow the fluid in the fluid supply line to flow towards the installation for actuating the desired actuator.

According to yet another aspect of the invention, the method may comprise the steps of setting the pressure range at the remote location and communicate instructions of the desired pressure range to the electronic unit, which then actuates the desired elements in the system to deliver the desired pressure range. In this manner, one may set the system to deliver different pressures at different times to operate different actuators connected to different valves in the well in order to produce from specific desired formations.

According to another aspect of the invention, the method may comprise the steps of measuring the pressure drop in the accumulator over time to thereby calculate the flow rate towards the installation, and accordingly the use of hydraulic fluid at the subsea installation. The method may also comprise the steps of not including the periods of time when the second control valve is in an open position, when hydraulic fluid is released to the return line to drop the pressure in the system for being able to deliver hydraulic fluid at a lower pressure range.

The method may also comprise the features of sensing the pressure by pressure sensors arranged upstream of the first control valve and downstream of the accumulator. These values are communicated back to the electronic unit, which checks with the set pressure range at the given time and then acts if the values are outside the allowed pressure ranges at that time.

The invention also provides a device for regulating a pressure in a fluid supply system for operating at least one actuator in a subsea installation. The device comprises a fluid supply line which is connected to a source of pressurized fluid at a remote location that delivers fluid at a constant pressure. According to the invention, the system comprises a first control valve connected to said fluid supply line for regulating the supply of fluid at the given pressure to an accumulator which includes a pressure sensor. The system also includes a second control valve connected to a return line, which return line is connected to the fluid supply line. The accumulator is arranged between the first and second control valves. The control valves are arranged to respond to signals from an electronic control unit to bring the fluid pressure in the accumulator within a desired pressure range for operating the actuator. In this manner, a device is provided which may supply a pressure in a given interval for operating the desired actuator. The pressure of the fluid in the accumulator may be increased by opening the first control valve and may be decreased by opening the second control valve to dump the fluid into the return line.

The return line is connected to the fluid supply line downstream of the first control valve. The second control valve may be positioned in the return line or possibly in the connection between the fluid supply line and the return line. The control valves may be two state valves with an open state and a closed state, permitting or blocking the flow of fluid through the fluid line to which they are connected. The valve may also have several possible positions, regulating the flow of fluid through the valve. At least one of the control valves may also be a three way valve. The control unit is in communication with the sensors and valves in the system.

According to a further aspect of the invention, the device may comprise a second pressure sensor connected to the fluid supply line upstream of the first control valve for registering the pressure in the fluid supply line at that site. The pressure registered by the second pressure sensor may be used to calculate how much fluid should be added to the system in order to maintain the system within the desired pressure range.

According to another aspect of the invention, the device may comprise a first restriction orifice between the first control valve and the accumulator. Alternatively or in addition, the device may comprise a second restriction orifice downstream of the second valve device in the fluid return line. The restriction orifices serve to even out any pressure waves propagating through the device.

According to yet another aspect of the invention, the device may comprise a first one way valve connecting the upstream and downstream sides of the first control valve to thereby allow fluid to flow from the downstream side to the upstream side.

According to another aspect of the invention, the electronic unit may comprise a programmable controller which is configured to receive instructions from a remote location and send data regarding the actual state at the subsea installation to the remote locations.

These and other objects and advantages of the present invention will be made apparent from the following detailed description, with reference to the accompanying drawings.

DETAILED DESCRIPTION OF THE INVENTION

Figure 1:
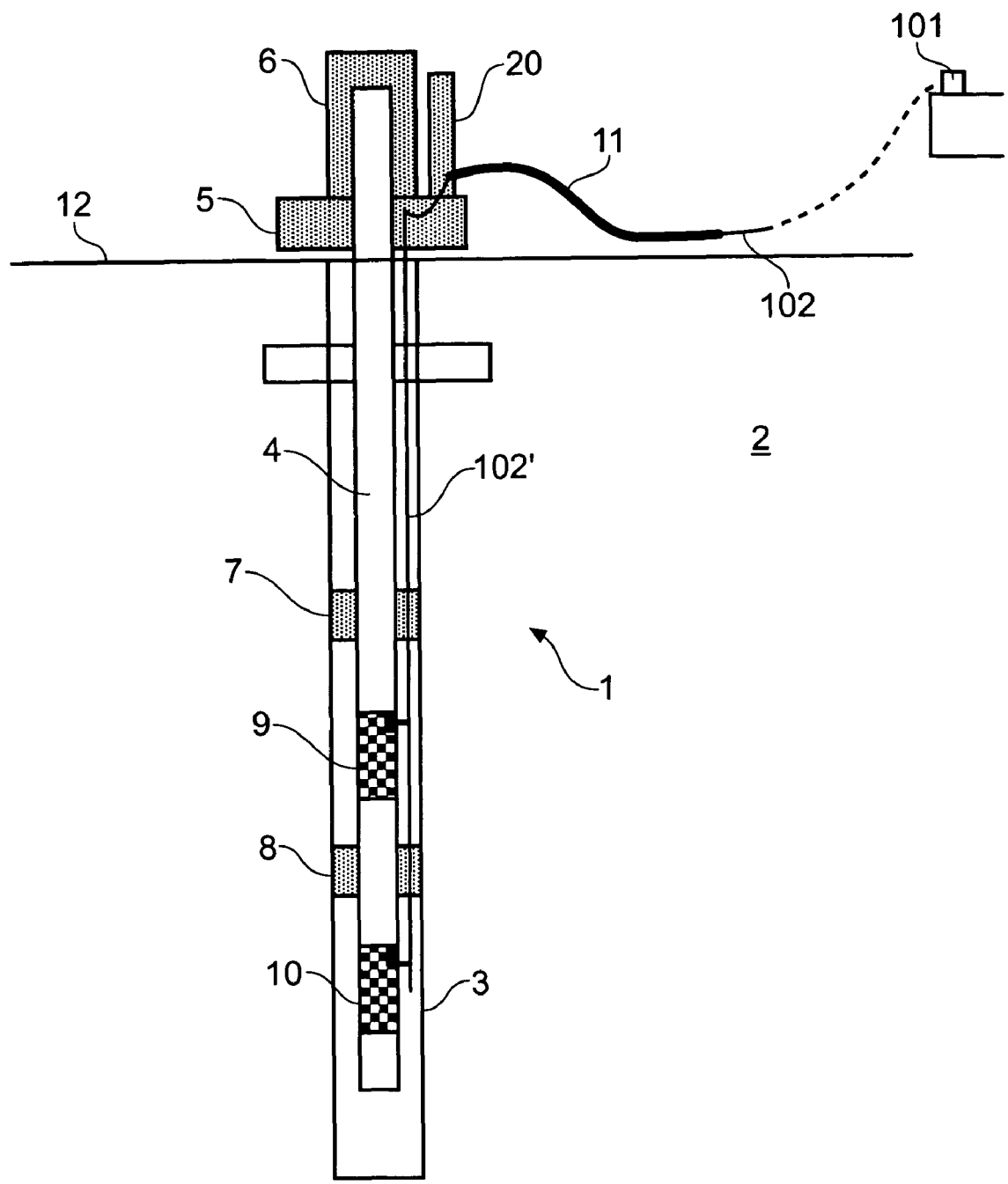
FIG. 1 is a schematic representation of the system of the present invention shown in relation to a subsea installation.

Referring to FIG. 1, a well 1 is shown extending into the ground 2 from a surface 12. A casing 3 is arranged within the well 1, and a production tubing 4 is arranged within the casing 3, thereby forming an annulus between the casing 3 and the tubing 4. At the surface 12 the production tubing 4 is connected to a wellhead 5 and a X-mas tree 6.

First and second packers 7 and 8 are positioned in the annulus between the casing 3 and the tubing 4 to seal off different sections of the annulus from each other. This may be for isolating production from separate zones in the well 1. A first production valve 9 is positioned in the production tubing 4 between the first and second packers 7, 8, and a second production valve 10 is positioned in the production tubing 4 below the second packer 8. The first and second production valves 9, 10 regulate flow from the separated sections of the annulus into the production tubing 4.

An umbilical 11 from a remote location (not shown) is connected to a control module 20 located at the X-mas tree 6. The umbilical 11 includes, among other lines, a fluid supply line 102 comprising at least two fluid lines, a high pressure (HP) line and low pressure (LP) line. The fluid supply line 102 is connected to the control module 20, and from the control module 20 a continuation 102' of the fluid supply line 102 extends into the well and is connected to the first and second valves 9, 10, which include actuators for operating the valves.

Figure 2:
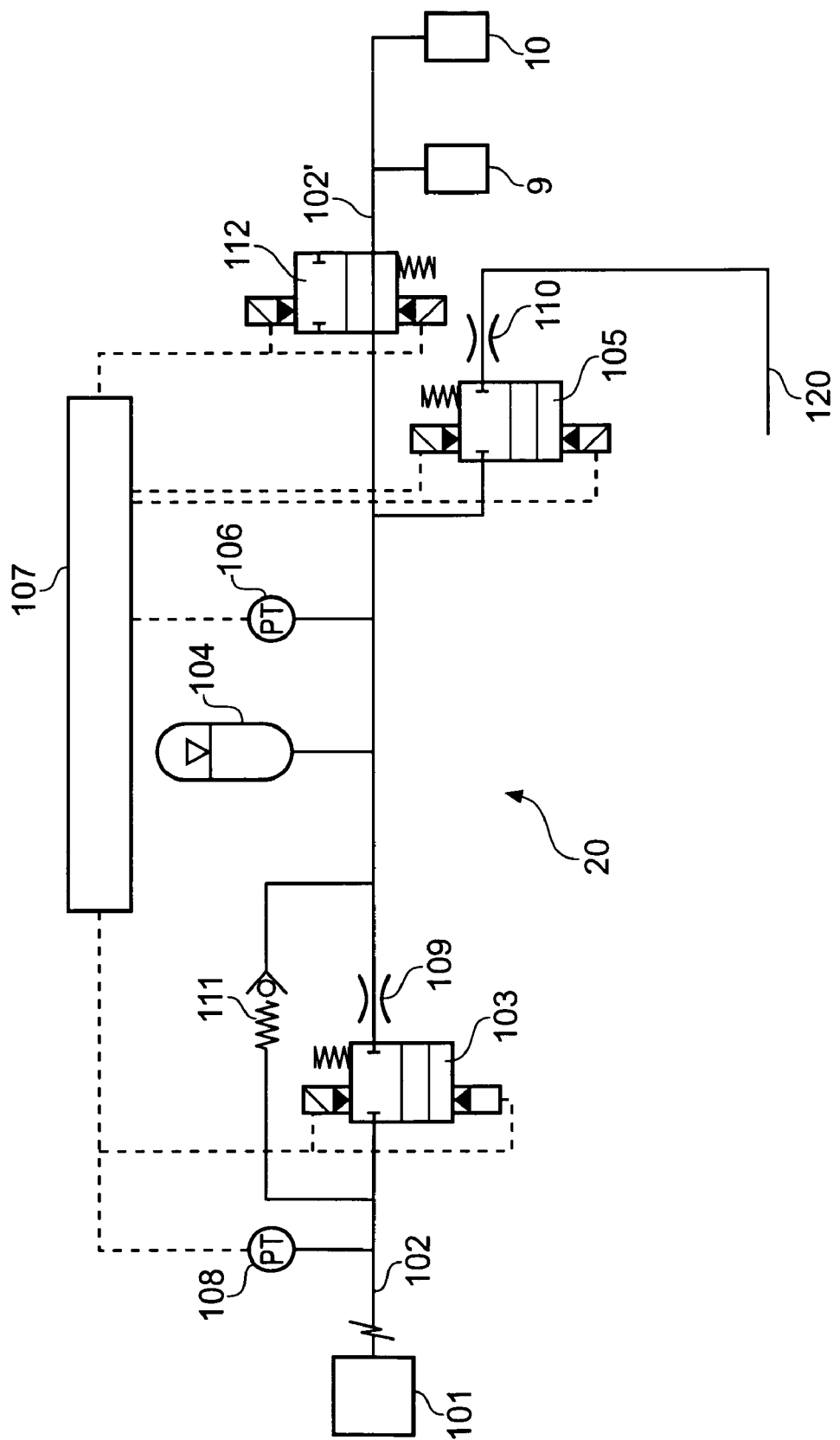
FIG. 2 is a schematic representation of the components of the system of the present invention.

Referring to FIG. 2, the pressure regulating device of the present invention is ideally located near the subsea installation and comprises a first control valve 103 which is arranged in a fluid supply line 102 that is connected to a source of pressurized fluid 101. The first control valve 103 comprises two positions, an open position and closed position, and is set to a closed neutral position. A pressure sensor 108 is located upstream of the first control valve 103 and is connected to an electronic control unit 107, as shown by the dotted line.

Positioned in the fluid supply line 102 downstream of the first control valve 103 are a first orifice 109, an accumulator 104, a pressure sensor 106 and a second control valve 105. The second control valve 105 is connected between the fluid supply line 102 and a return line 120 and comprises two positions, an open position and a closed position, for connecting/disconnecting the return line 120 to/from the fluid supply line 102. The second control valve 105 is set to a closed state in a neutral position.

The first control valve 103, the second control valve 105 and the pressure sensor 106 are each in communication with the electronic control unit 107, as indicated by dotted lines. A second orifice 110 is positioned in the return line 120 downstream of the second control valve 105, and a one-way check valve 111 is positioned between the downstream and upstream sides of the first control valve 103 to thereby permit fluid to flow from the downstream side to the upstream side.

An optional third control valve 112 is located in the fluid supply line 102 downstream of the second control valve 105, where the continuation 102' of the fluid supply line 102 leads down to the actuators for the first and second valves 9, 10. The third control valve 112 comprises two positions, an open position and closed position, and is set to the open position in a neutral configuration. The third control valve 112 is also connected to the electronic control unit 107.

By operating the different elements of the pressure regulating device of the present invention, several different pressure ranges may be obtained from one fluid supply line for operating the different valves in the well. For instance, the valve 9 may be operated by a different pressure range than the valve 10, and by regulating the pressure delivered to these valves one may operate the desired valve to open or close the fluid flowing to or from the annulus associated with this valve. In addition, only one hydraulic fluid supply may be needed, rather than both a high pressure supply line and a low pressure supply line. Alternatively, a pressure regulating device according to the invention may be connected to each of the high and low pressure supply lines. The pressure regulating device may also be used to provide the correct fluid pressure to other elements of the subsea installation.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A method for regulating a pressure in a hydraulic system for operating at least a first actuator in a subsea installation, the hydraulic system having a fluid supply line connected to a source of pressurized fluid at a remote location for delivering fluid at a constant pressure to the subsea installation, the method comprising:

providing first and second control valves in the fluid supply line upstream of the first actuator, the first and second control valves being controlled by an electronic control unit;

providing an accumulator in the fluid supply line between the first and second control valves;

providing a first pressure sensor for measuring the pressure in the accumulator;

if the pressure of the fluid in the accumulator is below a desired first pressure range for operating the first actuator, adding fluid from the source of pressurized fluid to the accumulator through the first control valve until the pressure of the fluid in the accumulator is within the desired first pressure range; and if the pressure of the fluid in the accumulator is above the desired first pressure range, releasing fluid from the accumulator through the second control valve to a fluid return line until the pressure of the fluid in the accumulator is within the desired first pressure range.

2. The method according to claim 1, wherein the subsea installation comprises a second actuator which is connected to the fluid supply line downstream of the first and second control valves, and wherein the method comprises;

if the pressure of the fluid in the accumulator is below a desired second pressure range for operating the second actuator, adding fluid from the source of pressurized fluid to the accumulator through the first control valve until the pressure of the fluid in the accumulator is within the desired second pressure range; and if the pressure of the fluid in the accumulator is above the desired second pressure range, releasing fluid from the accumulator through the second control valve to the fluid return line until the pressure of the fluid in the accumulator is within the desired second pressure range.

3. The method according to claim 2, further comprising:

providing a third control valve which is connected to the fluid supply line downstream of the second control valve;

closing the third control valve while the pressure of the fluid in the accumulator is being regulated to the desired first or second pressure range for operating the corresponding first or second actuator; and thereafter opening the third control valve to allow the fluid in the fluid supply line to flow towards the corresponding first or second actuator.

4. The method according to claim 1, wherein the desired first pressure range is set at the remote location and communicated to the electronic control unit.

5. The method according to claim 1, further comprising:

measuring a series of pressure drops in the accumulator over time; and calculating a flow rate from the source of pressurized fluid towards the installation based on the series of pressure drops.

6. The method according to claim 5, wherein the pressure drops are determined based on pressures sensed by the first pressure sensor and a second pressure which is arranged in the fluid supply line upstream of the first control valve.

7. In combination with a fluid supply system for operating at least a first actuator in a subsea installation, the fluid supply system comprising a fluid supply line connected to a source of pressurized fluid at a remote location for delivering fluid at a constant pressure to the subsea installation, the improvement comprising a system for regulating the pressure of the fluid delivered to at least the first actuator which comprises:

a first control valve which is connected to said fluid supply line proximate the subsea installation and upstream of the first actuator;

an accumulator which is connected to the fluid supply line downstream of the first control valve and upstream of the first actuator;

a second control valve which is connected between the fluid supply line and a fluid return line downstream of the accumulator and upstream of the first actuator;

a first pressure sensor for measuring a pressure of the fluid in the accumulator; and an electronic control unit which is connected to the first pressure sensor and the first and second control valves;

wherein when the pressure of the fluid in the accumulator is below a desired first pressure range for operating the first actuator, the electronic control unit opens the first control valve to add fluid from the fluid supply line to the accumulator until the pressure of the fluid in the accumulator is within the desired first pressure range; and wherein when the pressure of the fluid in the accumulator is above the desired first pressure range, the electronic control unit opens the second control valve to release fluid from the accumulator into the fluid return line until the pressure of the fluid in the accumulator is within the desired first pressure range.

8. The improvement according to claim 7, further comprising a second pressure sensor which is connected to the fluid supply line upstream of the first control valve for measuring a pressure of the fluid in the fluid supply line proximate the subsea installation.

9. The improvement according to claim 7, further comprising a first restriction orifice which is located in the fluid supply line between the first control valve and the accumulator.

10. The improvement according to claim 7, further comprising a second restriction orifice which is located in the fluid return line downstream of the second control valve.

11. The improvement according to claim 7, further comprising a first one way valve which is connected between a portion of the fluid supply line located upstream of the first control valve and a portion of the fluid supply line located downstream of the first control valve, the first one way valve allowing fluid to flow from the downstream portion to the upstream portion of the fluid supply line.

12. The improvement according to claim 7, wherein the electronic control unit comprises a programmable controller.

13. The improvement according to claim 7, wherein the subsea installation comprises a second actuator which is connected to the fluid supply line downstream of the second control valve; wherein when the pressure of the fluid in the accumulator is below a desired second pressure range for operating the second actuator, the electronic control unit opens the first control valve to add fluid from the fluid supply line to the accumulator until the pressure of the fluid in the accumulator is within the desire second pressure range; and wherein when the pressure of the fluid in the accumulator is above the desired second pressure range, the electronic control unit opens the second control valve to release fluid from the accumulator into the fluid return line until the pressure of the fluid in the accumulator is within the desired second pressure range.

14. The improvement according to claim 7, further comprising:

a third control valve which is connected to the fluid supply line downstream of the second control valve, the third control valve being connected to the electronic control unit;

wherein the electronic control unit closes the third control valve while the pressure of the fluid in the accumulator is being regulated to the desired first or second pressure range and then opens the third control valve to allow the fluid in the fluid supply line to flow towards the corresponding first or second actuator.

* * * * *

UNITED STATES PATENT AND TRADEMARK OFFICE
CERTIFICATE OF CORRECTION

| | | |
|---|---|---|
| PATENT NO. | : 8,156,953 B2 | Page 1 of 1 |
| APPLICATION NO. | : 12/075907 | |
| DATED | : April 17, 2012 | |
| INVENTOR(S) | : Johannes Tore Tveita | |

It is certified that error appears in the above-identified patent and that said Letters Patent is hereby corrected as shown below:

Column 5, line 61, after "second pressure" add -- sensor --;

Column 6, line 39, change "claim 7" to -- claim 9 --;

Column 6, line 59, change "desire" to -- desired --;

Column 6, line 66, change "claim 7" to -- claim 13 --.

Signed and Sealed this
Tenth Day of July, 2012

David J. Kappos
*Director of the United States Patent and Trademark Office*